(12) United States Patent
Raday

(10) Patent No.: US 7,413,623 B2
(45) Date of Patent: Aug. 19, 2008

(54) APPARATUS FOR RESIN-IMPREGNATION OF FIBERS FOR FILAMENT WINDING

(75) Inventor: Robert M. Raday, Land O'Lakes, FL (US)

(73) Assignee: RSE Industries, Inc., Clearwater, FL (US)

( * ) Notice: Subject to any disclaimer, the term of this patent is extended or adjusted under 35 U.S.C. 154(b) by 257 days.

(21) Appl. No.: 11/343,638

(22) Filed: Jan. 31, 2006

(65) Prior Publication Data

US 2006/0177591 A1 Aug. 10, 2006

Related U.S. Application Data

(60) Provisional application No. 60/650,289, filed on Feb. 4, 2005.

(51) Int. Cl.
*B65H 81/00* (2006.01)
(52) U.S. Cl. ................ 156/169; 156/173; 156/175; 156/425
(58) Field of Classification Search ................ 156/169, 156/172, 173, 175, 425, 428–430
See application file for complete search history.

(56) References Cited

U.S. PATENT DOCUMENTS

| | | | |
|---|---|---|---|
| 3,019,206 A * | 1/1962 | Robb .................. | 524/501 |
| 3,492,187 A * | 1/1970 | Hirtzer ................ | 156/429 |
| 5,476,567 A * | 12/1995 | Fujisawa et al. ...... | 156/281 |
| 5,766,357 A | 6/1998 | Packer et al. | |
| 5,801,128 A * | 9/1998 | Overstreet et al. ...... | 508/159 |
| 6,179,945 B1 | 1/2001 | Greenwood et al. | |
| 6,387,179 B1 | 5/2002 | Anderson et al. | |
| 6,893,529 B1 * | 5/2005 | Ohman et al. ......... | 156/272.6 |

FOREIGN PATENT DOCUMENTS

| DE | 19824804 A1 * | 12/1999 |
|---|---|---|
| JP | 64-60632 A * | 3/1993 |

* cited by examiner

*Primary Examiner*—Jeff H Aftergut
(74) *Attorney, Agent, or Firm*—Brooks Kushman P.C.

(57) ABSTRACT

A two roll impregnator for impregnating fiber reinforcement for use in filament winding operatives contains two abutting rolls, at least one and preferably both having an elastomeric surface. Resin is constrained within a bath whose lower surfaces are defined by the abutting rollers and side dams. Fiber reinforcement is drawn over a first roller through the resin bath and between the closed nip of the abutting rollers, where full impregnation is fostered, excess resin removed, and the impregnated fiber degassed. Substantially dripless operation can be maintained.

20 Claims, 3 Drawing Sheets

APPARATUS FOR RESIN-IMPREGNATION OF FIBERS FOR FILAMENT WINDING

CROSS-REFERENCE TO RELATED APPLICATIONS

This application claims the benefit of U.S. provisional application Ser. No. 60/650,289, filed Feb. 4, 2005.

BACKGROUND OF THE INVENTION

1. Field of the Invention

The present invention relates an apparatus for use in impregnating fiber reinforcement with a resin for use in filament winding operations, to a process for the preparation of resin impregnated fiber reinforcement using the apparatus, and to filament winding employing resin impregnated reinforcing fibers produced thereby.

2. Description of the Related Art

Filament winding processes for preparing fiber-reinforced articles are now well established. Typically in such processes, resin impregnated strands, yarn, fabric, or tape of high-strength reinforcement fibers are used when making filament wound articles. Traditionally, these fibers are impregnated using thermosetting resins such as unsaturated polyester, epoxy, vinyl ester, polyurea, isocyanurate, and polyurethane resins. The reinforcement fibers are impregnated via passing them through either a resin bath, over an applicator roller, or of recent design, using an injection die.

Typically, when impregnating reinforcement fibers using a resin bath, the fibers are drawn through a large open bath of premixed resin. While in the bath the fibers are "weaved" back and forth through a series of bars, so as to press the resin through the fibers impregnating them. After passing through the resin bath, the fibers are then drawn through a bushing, sandwiching the fibers within the opening and squeezing out the excess resin. U.S. Pat. No. 5,766,357 describes a typical device used to sandwich the fibers as consisting of multiple sets of brass half rings and rubber plugs. Setup of the system can be difficult and time consuming, especially as the size of the bath and the number of bars through which the fibers are weaved increases. Generally speaking, the bath is a messy operation and requires an extreme excess of resin to insure saturation of the fibers, resulting in significant resin waste during processing and clean-up. The process also involves many resin-wetted parts, which increases the time required for clean-up, break-down and set-up of the system. These systems are also limited to employing resins with long gel times so as to maintain a sufficiently low viscosity within the bath to consistently wet-out the fibers, and especially, to avoid gelling the large volume of resin within the bath. Running time is often limited due to gelation of resin in stagnant areas of the resin bath, requiring shut down, removal of resin, clean up, and restart.

As fiber speeds through the bath increase, so to does the tension applied to the fibers and the finished part. This tension increases the wearing of the glass and negatively affects the strength of the finished part. Also, a "churning" of the resin occurs in the bath which entraps air within the resin and thus on the wetted fibers as they pass through the bath. This air is then entrapped within the filament wound part causing voids within the laminate, and thus weakening the part. The fibers experience additional wear and tension when sandwiched for "squeezing" to remove excess resin and provide full impregnation. During squeezing the brass and rubber edges of the bushings exert force and tension on the fibers in order to squeeze out the excess resin and as a result the fiber is put under increasing stress that causes the fiber to break and "fray" which weakens the part, creates the need to clean the applicator and tooling more frequently, and worsens the aesthetics of the finished composite part or article. The tension and its effects worsen when either of the edges used to squeeze the fibers is static (i.e. non-rotating). The disclosure of U.S. Pat. No. 5,766,357 and the references cited therein are herein incorporated by reference.

A typical applicator roller system along with some of the system's drawbacks is also described in the aforementioned U.S. Pat. No. 5,766,357. In these prior art systems, the fiber is drawn across an open wheel which dips into a reservoir of premixed resin ("kiss roll"). The system uses a knife blade or doctor blade to control the thickness of the mixed resin layer adhering to the roller. The fiber is impregnated by rolling it across the roller and through the adhering resin layer. Setup of the system can be difficult and time consuming especially when a roller and doctor blade are used for resin impregnation. In these systems, controlling the thickness of the adhering resin layer is very difficult. The viscosity of resin, which changes over time, and temperature and humidity all affect the adhering resin layer. Also, the speed and tension with which the fiber is drawn changes the impregnation roller speed which in turn affects the hydraulic pressure of the resin between the doctor blade and the resin impregnation roller. Finally, the doctor blade is set while the system is stopped and cannot generally be adjusted while the fiber is being drawn over the impregnation roller. Therefore, in systems like this, controlling the doctor blade is very difficult, but is critical to ensuring the proper amount of resin is incorporated into the fiber. A further and important drawback is that a large areal surface of resin is exposed to the air on the rollers, which will cause advancement of certain of the resins, particularly those which are moisture sensitive.

Under prior known systems, the fiber tension and speed have been found to have a profound influence on the amount of resin incorporated into the fibers. Fiber tension and speed can change in a system where the fiber is moved across an open wheel. Since the resin is incorporated through capillarity, the amount of resin pickup may vary considerably. Also, since the fiber passes over a coated wheel, only the side in contact with the wheel contacts the resin. This may lead to non-uniform impregnation and poor incorporation into the final manufactured part. Finally, the resin used in the manufacture of certain articles ages constantly and quickly changes its viscosity, especially in situations where the resin is held in an open reservoir at room temperature. A change in the viscosity of the resin also affects the amount of resin entering the fiber by capillarity. To reduce this problem the resin is generally replaced every four to eight hours. Replacement of the resin is wasteful and further requires disposal of unused hazardous materials, which increases manufacturing costs significantly.

U.S. Pat. Nos. 5,766,357 and 6,179,945 disclose an improvement in filament winding wherein the reinforcement material passes through a die or manifold into which matrix resin is injected. As a result, impregnation baths and potentially applicator rollers are eliminated. However, such injection or manifold applicators tend to apply increasing tension and cause fiber wear at high speeds due to the friction caused by squeezing the fibers through a die or manifold in which the contact edges are static (i.e. non-rotating). As previously stated, when the fiber is put under increasing stress the fiber will break and "fray" which weakens the part, creates the need to clean the applicator and tooling more frequently, and worsens the aesthetics of the finished composite part or article. Moreover, differently sized fiber materials require a distinct die adapted in geometry to coincide with the shape of the fiber reinforcement being applied. Thus, different sizes of yarn, tow, etc. will require a different die or manifold, as will tape opposed to yarn, etc. U.S. Pat. No. 6,387,179 also discloses a die type device. The disclosure of U.S. Pat. Nos. 6,179,945 and 6,387,179 and the references cited therein are herein incorporated by reference.

Thus, to date, balancing consistent wetting and full impregnation while delivering increased line speeds with minimal air entrapment, tension, and detriment to fibers caused by the fraying of these fibers has proven difficult to achieve. Furthermore, balancing the resin to glass ratio so as to promote maximum impregnation, while leaving minimal excess resin to be lost during the processing of the reinforcement fibers has also proven difficult using these traditional impregnation means (i.e. baths, applicator rollers, etc.). And, as stated in U.S. Pat. No. 6,179,945 there is a need for an improved filament winding impregnation process and apparatus whereby: 1) higher application rates of fiber reinforcement material can be wetted to reduce the time required to form a filament wound part; 2) filament wound parts can be formed with a higher reinforcement content; 3) voids in final parts or articles can be reduced; and 4) improved resin utilization occurs.

SUMMARY OF THE INVENTION

The present invention provides a novel apparatus for use in the process of filament winding parts or articles. It provides a resin impregnation system whereby reinforcement material is passed through a "drip-less" two roll impregnator, wherein the reinforcing fibers are simultaneously saturated, impregnated, degassed, and nipped, preferably employing a thermosetting resin (i.e. polyester, epoxy, vinyl ester, polyurea, isocyanurate, polyurethane, etc.). In one embodiment, the invention involves passing reinforcement material, prior to being wound onto a mandrel or preformed shape, between two impregnation rollers whereby the reinforcement material is impregnated with resin material. The impregnation rollers are capable of increasing the rate at which reinforcement material can be impregnated while continually yielding complete impregnation of the reinforcement fibers. Further, the impregnation rollers allow for the processing of more advanced resin systems (i.e. systems with higher viscosities and faster gel times) and heavy reinforcement materials that were previously unusable in filament winding processes. The finished parts or articles filament wound using this novel impregnation apparatus exhibit reduced voids due to entrapped air. Moreover, the nipping effect of the impregnation rollers coupled with the small bath-like resin area within the rollers and the "drip-less" resin reclaiming dams, provide for improved resin utilization and minimal waste.

In the present invention, a novel two roll impregnator is used. Thus, an improved filament winding process in accordance with the invention comprises the steps of: providing reinforcement material; providing a two roll impregnator; providing a winding apparatus that includes a rotating mandrel or shape; filling the impregnator with thermosetting resin and adjusting the two rollers, drawing the reinforcement material through the two roll impregnator; so as to impregnate the reinforcement fibers; and winding the impregnated fibers about the mandrel or preformed shape so as to form a composite part or article. In a preferred embodiment, the present invention relates to a process and to an apparatus wherein reinforcement material is simultaneously saturated, impregnated, degassed, and nipped using a thermosetting resin while being passed through a novel impregnation roller prior to being wound on either a mandrel or preformed shape.

DETAILED DESCRIPTION OF THE PREFERRED EMBODIMENT(S)

While this invention may be embodied in many different forms, there are described in detail herein specific preferred embodiments of the invention. This description is an exemplification of the principles of the invention and is not intended to limit the invention to the particular embodiments illustrated. Furthermore, while the apparatus is described for use in preparing fiber reinforcement for use in filament winding processes, the apparatus may also be used to impregnate fiber reinforcement with resin for use in other processes as well, for example the preparation of prepreg materials.

Thus, one aspect of the invention pertains to a process for the impregnation of fiber reinforcement for use in filament winding, this process including the steps of: supplying at least one continuous fiber reinforcing material; passing the fiber reinforcing material around a tensioning device and over a first cylindrical impregnation roller; passing the fiber reinforcing material through a liquid resin contained in a resin reservoir located between dams bearing against the first cylindrical impregnation roller and a second cylindrical impregnation roller, at least one of the impregnation rollers having an elastomeric surface, with the rollers parallel to and abutting each other forming a closed nip defining the bottom of the resin reservoir, and which substantially prevents resin in said resin reservoir from flowing through said closed nip; passing the fiber reinforcement, now wet with resin from the resin reservoir, through the closed nip to fully impregnate the fibers, degas the impregnated fibers, and remove excess resin,; and filament winding the resin impregnated fiber reinforcing material to form a filament wound structure.

A further aspect of the invention pertains to a filament winding fiber reinforcement impregnating apparatus, suitable for use in impregnating fiber reinforcement for use in filament winding operations, the apparatus consisting minimally of two parallel cylindrical impregnation rollers, at least one roller having an elastomeric covering on its cylindrical surface, the position of the rollers adjustable with respect to each other such that the rollers abut against one another such that resin constrained by a dam above the rollers will not leak past a lineal contact area ("closed nip") of the rollers; a dam in contact with the rollers and defining, together with the surfaces of the abutting rollers, a resin reservoir between the rollers, the bottom of the reservoir being the lineal contact area of the rollers; and an alignment device positioned prior to a first of said rollers, between said first roller and a supply of reinforcing fibers.

Figure 1:
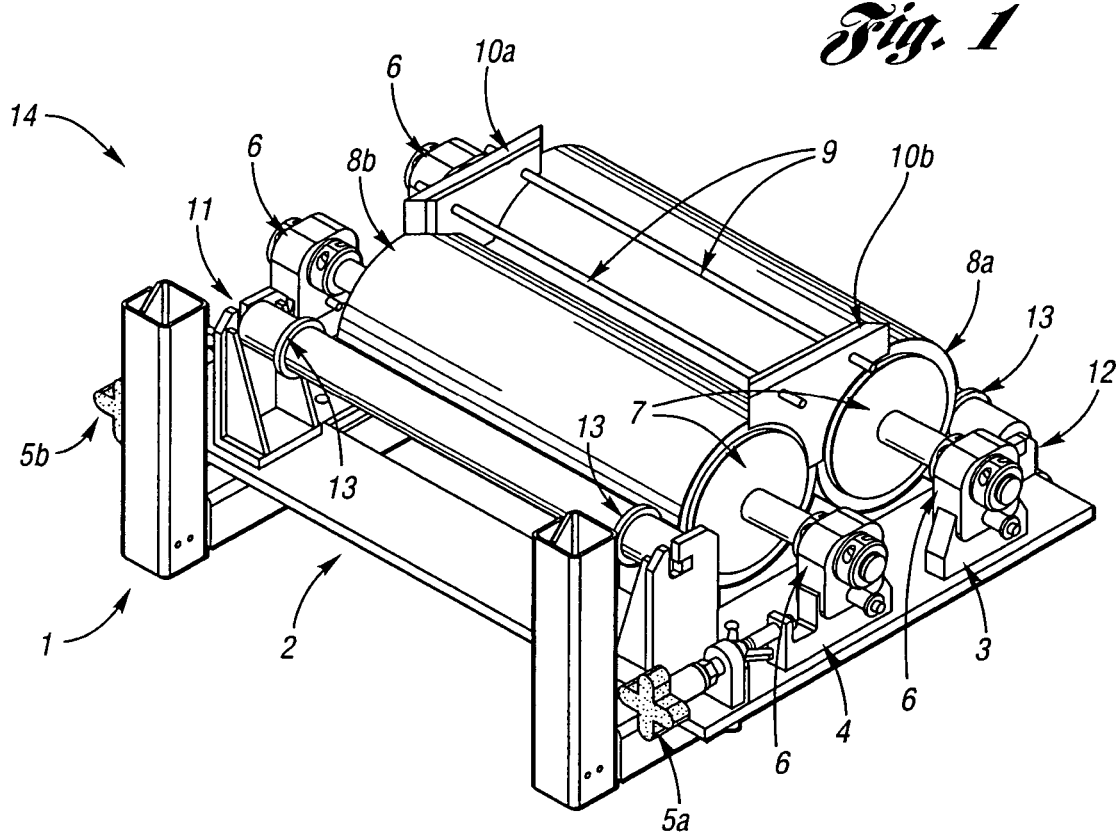
FIG. 1 is a rear perspective view of an apparatus constructed in accordance with the present invention.

The apparatus 14 in FIG. 1 is used to simultaneously saturate, impregnate, degas, and nip reinforcement fibers using a thermosetting resin when constructing filament wound composite parts or articles. The apparatus is comprised of the following: A mounting bracket 1 to which the base 2 can be mounted for adaptation to different equipment carriages.

Figure 3:
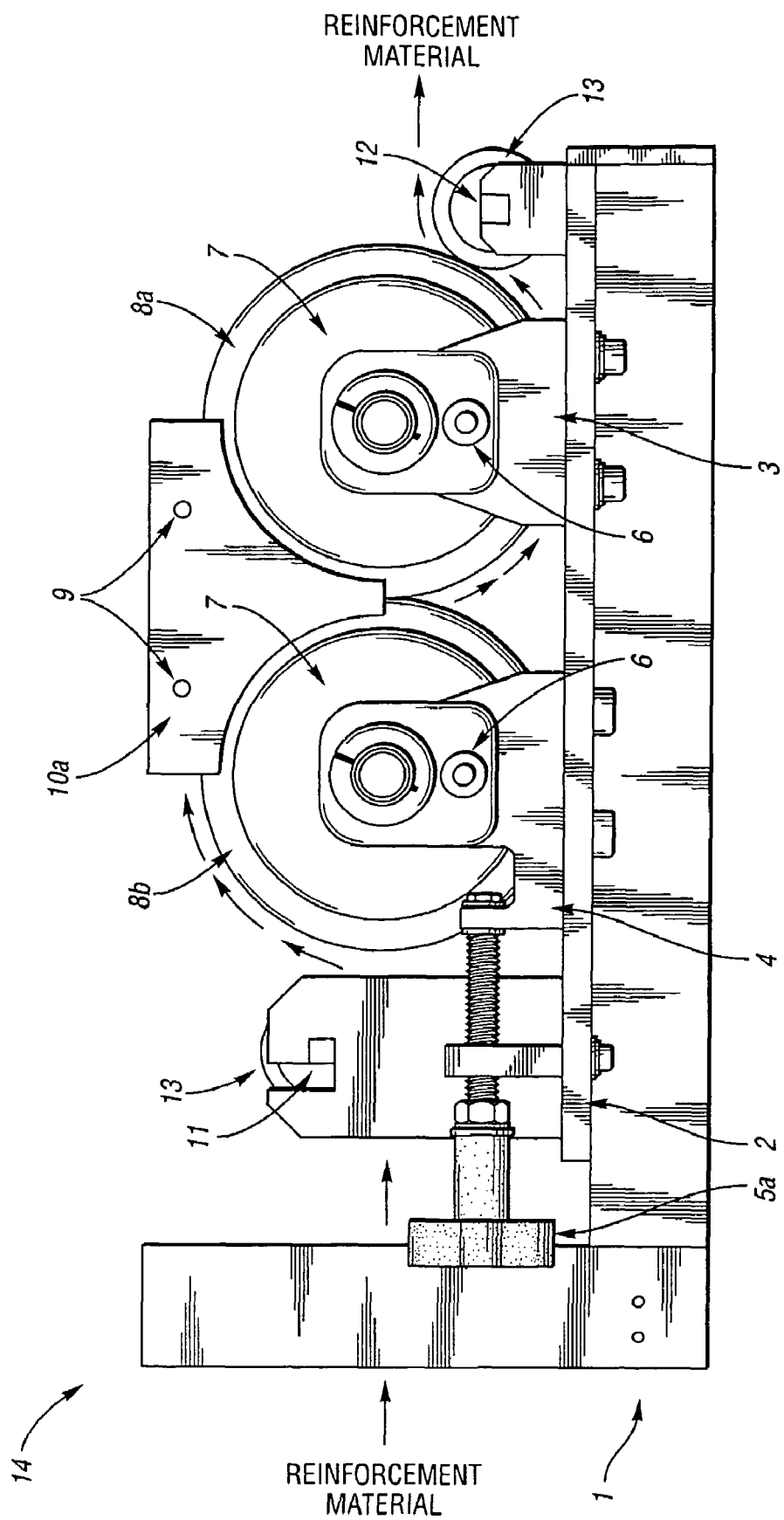
FIG. 3 is a side view of the apparatus of FIG. 1.

Attached to the base 2 are a set of alignment/tensioning bars 11 and 12. Attached to these alignment bars are collars 13. The collars 13 can be adjusted left-to-right to align the reinforcement material within the "wet" working area of the rollers. Alignment/tensioning bar 11 is used to align the "dry" reinforcement material prior to entering the "wet" area of the rollers 7 and alignment/tensioning bar 12 is used to align the impregnated reinforcement material after exiting the rollers. Review of FIG. 3 shows that the bars 11 and 12 are slightly offset from the rotation axes of each of their respective rollers 7. This allows the bars to create tension on the reinforcement fibers, pressing the fibers over the respective crowns of the rollers and thus increasing the impregnation efficiency. Note that bars 11 and 12 can be substituted for by other alignment devices (i.e. combs, rollers, etc.). Also, their positioning can be adjusted to minimize the tension applied to the reinforcement fibers. However, it is important that the reinforcement fibers maintain a substantially straight path through the nip point of the rollers. If the reinforcement material is not properly aligned when entering and exiting the rollers the shear generated by the rollers may damage the fiber and potentially weaken the final laminate or worsen the final aesthetics of the finished part or article.

Each roller is attached to a bearing set 6. These bearing sets are attached to mounting brackets 3 and 4. It is important to note that the bearings can be used to increase or decrease the tension applied to the reinforcement. Experiments have proven that "high-speed" bearing sets exert less tension than typical "industrial" bearings. Mounting brackets 3 are bolted in place to base 2. Mounting brackets 4 are attached to base 2 and have the ability to be adjusted both toward and away from the roller that is mounted to bracket 3. At least one of the two rollers must have the capability of being adjusted forward and backward, or closer to and farther from the other roller. In this case, bracket 4 is adjusted by turning the knobs 5a and 5b. This adjustment is used to increase or decrease the force applied at the nip point between the rollers 7. As the rollers surfaces 8a and 8b are pressed together greater shear is applied to the reinforcement fibers and less resin is transferred to the finished composite part or article. Note: knobs 5a and 5b should be turned equally so as to maintain consistent gapping between each side of the rollers 7 and as the gap between the two rollers is decreased the tension applied to the reinforcement fibers and the finished composite part or article is increased.

The rollers 7 are preferably constructed of hollow aluminum drums and solid aluminum end caps with shafts that extend through and match the inside diameter of the bearing sets 6. These drums have then been covered with materials 8a and 8b. In this case, coatings 8a and 8b are urethanes of different durometers. The use of materials with different durometers allows for the compression of the lower durometer material during closure of the gap between rollers 7. The use of varying durometers of urethanes or rubber has proven to be very effective. Furthermore, these materials can also be used in combination with other materials such as either plastics or metals. However, the weight of the rollers will ultimately affect the tension applied to the reinforcement fibers and finished composite part. When covering the rollers 7 with materials 8a and 8b the ends of the rollers are left uncovered. The amount left uncovered must be wide enough to accommodate the "drip less" resin reclaiming dams 10a and 10b. The dams 10a and 10b are designed to match the contour between each of the rollers 7 and are designed to ride in contact with the rollers at the uppermost point of the rollers (i.e. 12 o'clock when viewed from the side as in FIG. 3).

The contact between the dams and the covers 8a and 8b is designed to minimize the tension and to create a seal between the covers and the dams. Therefore, in one embodiment, roller surfaces 8a and 8b are recessed starting from the aluminum surface of the roller 7 moving upward toward the surface of the roller covers 8a and 8b. The recess preferably stops approximately 15-20 thousands of an inch (0.4 mm to 0.5 mm) short of the covers' surface, leaving only a small lip that will both minimize the contact between the dams and the roller's cover and create a "ring-like" seal that will minimize resin leakage from within the rollers resin bath area. The amount of tension applied to the seal between the dams 10a and 10b and the covers 8a and 8b can be adjusted by changing the length of the bar(s) 9. The dams are attached to and therefore pulled together by the bar(s) 9. Therefore, shortening the bar(s) will increase the pressure and lengthening the bar(s) will decrease the pressure between the dams and the covers.

Once the apparatus 14 is assembled, the adjustment knobs 5a and 5b are turned in order to set a small gap (i.e. ¼ inch) between the roller covers 8a and 8b. Reinforcement material is then strung as shown in FIG. 3. It should be noted that the reinforcement fibers are generally pre-strung through any initial tooling that is located prior to the apparatus. Working from left to right, the fibers are first drawn under the alignment/tensioning bar 11; the fibers are then drawn over the top of the roller that is attached to mounting bracket 4; once over this roller the fibers are drawn between the two impregnation rollers and back up under the roller attached to mounting bracket 3. To complete the stringing of the apparatus, the fibers are then drawn over the alignment/tensioning bar 12. Having completed the stringing of the apparatus, the reinforcement fibers must then be strung through any remaining tooling and prepared for winding. Knobs 5a and 5b are then turned to compress the roller's surfaces 8a and 8b against one another. The amount of compression between the two rollers will be dictated by the requirements of the finished composite part or article. However, to start, the gap between the rollers must be sufficiently closed so as to not allow thermosetting resin to leak from the small resin bath area, which is located between the roller surfaces 8a and 8b and the dams 10a and 10b.

Thus, thermosetting resin is filled within the reservoir atop the rollers, e.g. formed by the juncture of the rollers and limited sideways by the dams. The thermosetting resin may be of polyester, epoxy, vinyl ester, polyurea, isocyanurate, polyurethane, or any other thermosetting resin having sufficient gel time for use in filament winding. Such resins include also bismaleimide resins, cyanate resins, addition curable organopolysiloxane resins, and the like. This list is illustrative, and not limiting. Furthermore, while for ecological reasons neat resin systems are preferred, solvent based systems or aqueous dispersions may also be used. In solvent based systems, thermoplastic resins as well as hybrid crosslinkable or chain-extendable thermoplastic resins may also be used. The fibers are drawn through the impregnation apparatus and their alignment within the "wet" working area of the rollers surfaces may be adjusted using collars 13. As the reinforcement fibers are drawn under the alignment/tensioning device 11 the fiber tows, yarns, or tapes are flattened. These flattened reinforcing fiber assemblies are then drawn over surface 8b and down into the thermosetting resin reservoir. Once in the reservoir, the reinforcement fibers are saturated. Then, as the fibers are drawn through the nip point between surfaces 8a and 8b the saturated fibers are impregnated, degassed, and excess resin is removed. The impregnation, degassing, and removal of excess resin is accomplished as a consequence of the force and shear applied to the fibers when compressing the roller surfaces together at the nip point. The force may be increased or decreased by the turning of knobs 5a and 5b. When properly adjusted the resulting fiber is continuously and fully impregnated, degassed, and devoid of large amounts of excess resin. Having passed through the nip point the now impregnated fibers are drawn under roller surface 8a and over the top of the alignment/tensioning device 12.

The improvements observed when using a "drip-less" two roll impregnator in the manufacture of filament wound composite parts or articles in accordance with the invention are as follows: 1) increased fiber impregnation/wet-out 2) increased line speeds 3) decreased resin usage 4) decreased voids within the finished laminate 5) increased ratio of reinforcement material to resin, and 6) ability to use fast gel time and higher viscosity resins. Overall, the resulting composite parts are wound in shorter time, using less resin, creating dense laminates free of voids. Remarkably, all this is accomplished while simultaneously eliminating the "typical" resin mess associated with traditional applicators.

The rollers employed in the present apparatus must include at least one roller with an elastomeric surface, preferably an elastomer coated metal roller. If two essentially non-giving surfaced rollers, i.e. of metal or metal with a thin coating of release polymer such as PTFE are used, resin will flow between the rollers rather than being maintained in a reservoir defined by the converging rollers. Moreover, increased pressure between the rollers to minimize leakage will have the effects of both increased fiber breakage as well as lowering the amount of resin impregnation.

Thus, at least one roller must have an elastomeric surface, preferably in the low shore D range, or more preferably, in the Shore A range, more preferably Shore A 40 to Shore A 95, and yet more preferably, Shore A 70 to Shore A 90. When one roller is unyielding, the softness of the elastomer coating on the other roller coupled with the pressure between the two rollers will govern the degree of impregnation. When both rollers have elastomeric coatings, which is preferable, both coatings softnesses will affect the impregnation.

It has been found especially desirable to provide both rollers with elastomeric coatings, with one coating being softer than the other. The thickness of the coatings must be such so as to provide the necessary nip force to "squeeze" the resin back into the resin pool, while also providing the necessary impregnating force without significant damage to the fibers. The coating or "tire" thickness is thus preferably 5 mm or more, preferably in the range of 8 mm to 20 mm. In a most preferred embodiment, one coating is of polyurethane with a hardness of Shore A 80 (±5) while the other coating is Shore A 90 (±5). In some cases, the elastomer may be coated with a thin coating of a release substance such as PTFE or polyvinilidene fluoride, organopolysiloxane elastomer, etc., to also provide, when desired, chemical and solvent resistance. Alternatively, the elastomer tire may be made wholly of such material.

During rotation of the rollers, the resiliency of at least one and preferably both rollers against each other squeezes the resin back into the reservoir atop the rollers, which is not possible when unyielding rollers or a roller and doctor bar are employed. As a result, the rollers downstream from the reservoir rotate with very little resin, providing an essentially dripless environment.

Figure 4:
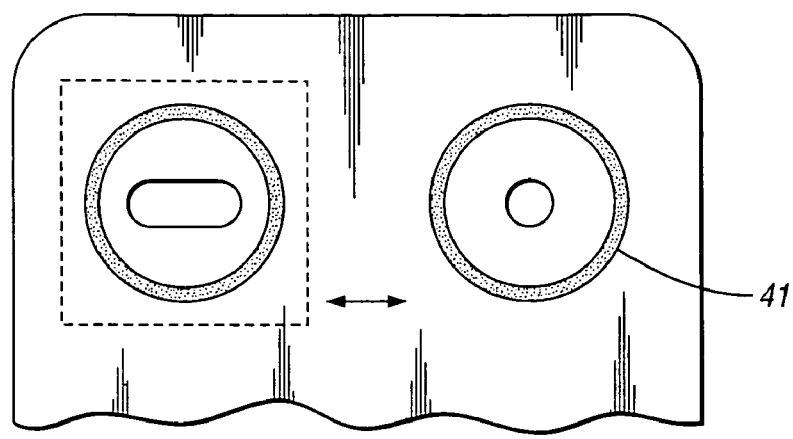
FIGS. 4, 5, and 6 illustrate alternative damming means which may be used with the subject invention.
Figure 5:
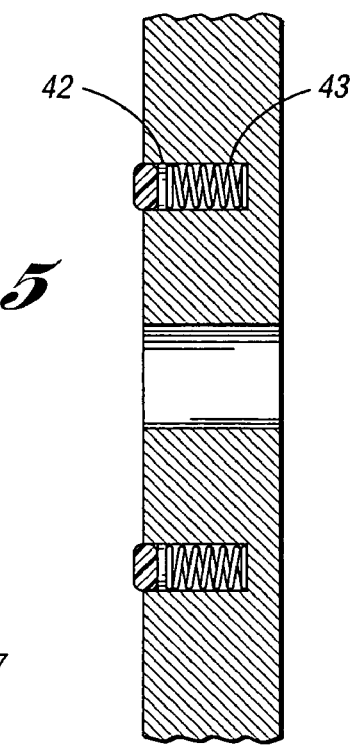
Figure 6:
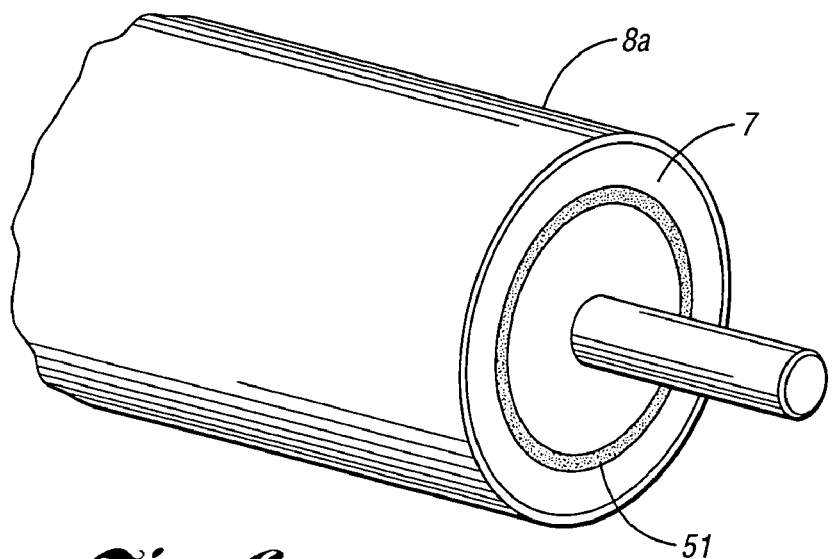

At the sides of the rollers, the reservoir is defined by a damming means. In the preferred embodiment, the damming means comprises individual side dams which sealingly bear against the sides or surfaces of the rollers or their elastomeric coverings. The damming means may also be provided by any other suitable means of preventing lateral flow of resin from the reservoir. For example, substantial side walls may extend upwards adjacent the ends of the rollers, and a teflon or other seal may be placed in the roller or in the sidewall. Such a seal may advantageously be spring loaded to ensure a complete seal. A section of a sidewall having a seal therein is shown in FIGS. 4 and 5, where the seal 41 is outermost of a movable washer 42, which is spring loaded by springs 43. In FIG. 6, the sealing ring 51 is an elastomeric but low friction seal such as may be made of fluorinated elastomer, located on the end of the roller. Such a seal may not require any spring load to function as intended. Multiple seals may of course be used, for example concentric seals. The seal on an end panel which is associated with a roller whose location is adjustable may be maintained in a block which is also movable so that the radial center of the seal will correspond with the center of the movable roller shaft.

Figure 2:
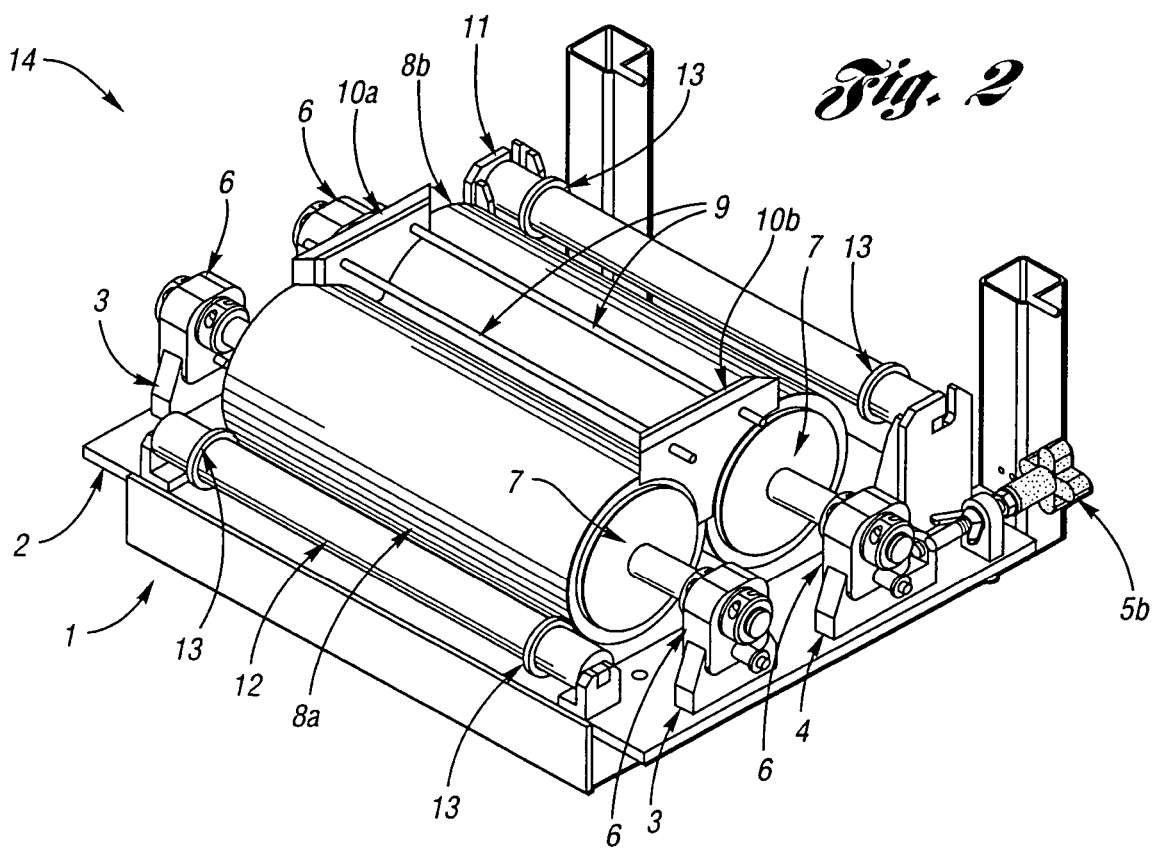
FIG. 2 is a front perspective view of the apparatus of FIG. 1.

The damming means may also be provided by a dam such as that shown in FIGS. 1-3, but which rides on top of the elastomeric covers of the roller, although this is a less desirable embodiment. It is also possible for extended sidewalls of the apparatus as shown in FIG. 4 to provide a damming means, with the elastomeric roller covers bearing against the walls directly. For this purpose, the elastomer cover may be made of a relatively friction free elastomer, may be faced or coated on an end surface with a low friction polymer, or may be machined with a recess to contain a seal.

The apparatus may also be associated with pneumatic or hydraulic means to engage the rollers and establish the desired pressure. Since the apparatus is essentially dripless, the degree of impregnation of fiber tows can be gauged by determining the fiber throughput and resin usage. Resin usage, for example, may be determined by measuring the height (volume) of resin in the reservoir coupled with the rate of resin feed to the reservoir. By dividing resin usage by fiber throughput, impregnation can be easily calculated on any basis, for example g/m of tow or g/g of tow. This information can be used to alert an operator to adjust the roller pressure up or down, or in automated systems, can be used to automatically adjust roller pressure. The greater the pressure, the less the degree of impregnation, and vice versa. The resin flow to the reservoir may also be adjusted by such means. A microcomputer or programmable logic array, for example, may be used to adjust pneumatic or hydraulic pressure when the latter are used, or to control resin flow.

The disclosed apparatus has many advantages over the devices of the prior art. Essentially dripless operation is a predominant feature, since loss of resin and cleanup are both minimized. However, it has been very surprisingly and unexpectedly found that line speed, in terms of lineal length of impregnated tow per unit time is dramatically increased relative to prior art devices, while at the same time providing minimal fraying and/or breakage of fibers. In addition, air entrapment in the resin is minimal, and any air entrapped within impregnated fibers is substantially eliminated during passage through the rollers. Thus, a high quality product is easily produced, and filament wound articles having fewer voids and higher mechanical properties is the result.

The apparatus is preferably operated at ambient pressure, but operation at higher and lower pressures is also contemplated. Operation in partial vacuum, for example, may further lower the air content of the already very low air content of the impregnated fibers, which may be of any type, i.e. glass, thermoplastic, carbon (graphite), aramid, very high density polyethylene, etc. The fibers are preferably in the form of tow, but ribbons of fibers may be used as well. By the term "continuous" with respect to fiber reinforcement is meant a very long length of tow, yarn, tape, or the like, as are generally supplied on spools, reels, etc., sometimes referred to as "packages".

The impregnation rollers of the apparatus of the present invention are driven by the tension of the reinforcing material in contact with the drums (rollers). For this reason, it is preferable that an alignment device, for example a stationary bar, a roller (rotatable bar), a plurality of spools, etc., precede the first impregnation roller to ensure a large angular contact of the fiber reinforcement with the roller, and that a second alignment device follow the second impregnation roller for the same purpose. It is to be understood that these alignment rollers may actually provide little or no aligning in practice, but may serve principally to define the angular contact between fiber and roller, and when necessary, to tension the fiber reinforcement as well. The bar, roller, spool, bushing, etc., may thus be termed "tensioning/alignment" devices.

In an actual device, fiber reinforcement will generally be supplied from a creel of reels, spools, or other supply of fibrous reinforcement in the form of strands, tow, yarn, unidirectional or woven tape, etc. Like other equipment where multiple sources of fiber reinforcement are used, the individual reinforcements are generally kept separate and guided through customary devices such as combs, bushings, etc. Such guiding devices may be wholly separate from the apparatus, or may be constructed as an integral part of the apparatus.

While the rollers of the inventive apparatus may be driven by the tension of the reinforcing material, i.e. by the filament winding machine itself "pulling" the fibrous reinforcement through the apparatus, the rotation of the rollers may be decoupled from the filament winding machine through the use of driven rollers, either one or both rollers being driven by an electrical motor, pneumatic or hydraulic motor, etc. In general, since the rollers do bear against each other, only one roller need be driven.

What is claimed:

1. A process for the impregnation of fiber reinforcement for use in filament winding, comprising:
   a) supplying at least one continuous fiber reinforcing material;
   b) passing said fiber reinforcing material around a tensioning/alignment device and over a first cylindrical impregnation roller;
   c) passing said fiber reinforcing material through a liquid resin contained in a resin reservoir located between dams bearing against said first cylindrical impregnation roller and a second cylindrical impregnation roller, at least one of said first or second impregnation rollers having an elastomeric surface, said first and second cylindrical rollers parallel to and abutting each other forming a closed nip defining a bottom of said resin reservoir, which substantially prevents resin in said resin reservoir from flowing through said closed nip, the reservoir being defined by the topmost surfaces of the rollers and the dams;
   d) passing said fiber reinforcement, wet with resin from said resin reservoir, through said closed nip; and
   e) filament winding a resin impregnated fiber reinforcing material obtained in step d).

2. The process of claim 1, wherein said step of supplying reinforcement material comprises supplying continuous strands, tow, yarn, fabric, or tape of high-strength reinforcement fibers.

3. The process of claim 2, wherein said continuous reinforcement material may be made up of any one or combination of strands, tow, yarn, fabric, or tape of high-strength reinforcement fibers.

4. The process of claim 1, wherein said resin is a thermosetting resin composition comprising at least one resin selected from the group consisting of polyester, epoxy, vinyl ester, polyurea, isocyanurate, and polyurethane.

5. The process of claim 1, wherein at least one of the two rollers used in the impregnator apparatus is adjustable so that the pressure in the closed nip between the rollers may be either increased or decreased.

6. The process of claim 1, wherein said tensioning alignment device comprises one or a plurality of rollers or bars.

7. The process of claim 1, wherein said tensioning alignment device also serves to align the reinforcing material perpendicular to the axes of rotation of the cylindrical rollers.

8. The process of claim 1, wherein both rollers are coated with an elastomer.

9. The process of claim 8, wherein the elastomer on one roller is harder than the elastomer on the other roller.

10. The process of claim 1, wherein the impregnated reinforcing material from step d) passes over an alignment roller which follows said second cylindrical impregnation roller, prior to said step of filament winding.

11. The process of claim 1, further comprising rotating at least one of said first and second cylindrical impregnation rollers by application of external rotating force.

12. The process of claim 1 wherein said dam comprises two side pieces, each contoured to fit within a depressed zone at an edge of the rollers.

13. A filament winding fiber reinforcement impregnating apparatus, suitable for use in the process of claim 1, comprising:
   a) two parallel cylindrical impregnation rollers, at least one roller having an elastomeric covering on its cylindrical surface, the position of said rollers adjustable with respect to each other such that the rollers abut one another such that resin constrained by a dam above the rollers will not leak past a lineal contact area of the rollers;
   b) a dam in contact with said rollers and defining, together with the surfaces of the abutting rollers, a resin reservoir between the rollers, the bottom of the reservoir being the lineal contact area of the rollers;
   c) an alignment device positioned prior to a first of said rollers, between said first roller and a supply of reinforcing fibers.

14. The apparatus of claim 13, further comprising a second alignment device positioned after said second cylindrical impregnation roller.

15. The apparatus of claim 13, wherein both said first and said second impregnation rollers have an elastomeric surface.

16. The apparatus of claim 15, wherein the elastomer surface of one of said cylindrical impregnation rollers is of a higher hardness than the elastomer surface of the other of said cylindrical impregnation rollers.

17. The apparatus of claim 13, further comprising a driving means suitable for driving rotation of at least one of said impregnation rollers.

18. In a process for filament winding a fiber reinforced article wherein resin impregnated reinforcing fibers are employed, the improvement comprising selecting as the resin impregnated reinforcing fibers, resin impregnated reinforcing fibers prepared by the process of claim 1.

19. The process of claim 18, wherein the reinforcing fibers are in the form of strands, tow, yarn, or tape.

20. In a process for filament winding a fiber reinforced article wherein resin impregnated reinforcing fibers are employed, the improvement comprising selecting as the resin impregnated reinforcing fibers, resin impregnated reinforcing fibers prepared by impregnating reinforcing fibers with resin using the apparatus of claim 13.

* * * * *

UNITED STATES PATENT AND TRADEMARK OFFICE
CERTIFICATE OF CORRECTION

| | | |
|---|---|---|
| PATENT NO. | : 7,413,623 B2 | Page 1 of 1 |
| APPLICATION NO. | : 11/343638 | |
| DATED | : August 19, 2008 | |
| INVENTOR(S) | : Robert M. Raday | |

It is certified that error appears in the above-identified patent and that said Letters Patent is hereby corrected as shown below:

On Title page, Under Assignee, Item (73):

RSE Industries, Inc. – should read:   TSE Industries, Inc.

Signed and Sealed this
Twenty-fifth Day of September, 2012

David J. Kappos
*Director of the United States Patent and Trademark Office*